United States Patent [19]

Selleck

[11] 3,908,022

[45] Sept. 23, 1975

[54] NON-SATURABLE BUN

[76] Inventor: George L. Selleck, 16-B Division St., Glens Falls, N.Y.

[22] Filed: Apr. 22, 1970

[21] Appl. No.: 30,764

[52] U.S. Cl. .................. 426/27; 426/138; 426/391; 426/496
[51] Int. Cl.² . A21B 5/02; A21D 13/00; A21D 8/06
[58] Field of Search ........... 99/87, 88; 426/27, 138, 426/391, 496

[56] References Cited
UNITED STATES PATENTS

| | | | |
|---|---|---|---|
| 1,696,343 | 12/1928 | Burdick | 99/87 X |
| 2,759,826 | 8/1956 | Lindsey | 99/88 |
| 3,290,154 | 12/1966 | Turner | 99/88 |
| 3,518,091 | 6/1970 | Turner | 99/88 |

*Primary Examiner*—James R. Hoffman
*Attorney, Agent, or Firm*—Pollock, Philpitt & Vande Sande

[57] ABSTRACT

A bun is baked with a channel therein for holding liquified food preparations. The channel is made to resist saturation by being hard baked to form a thick crust. This is done by using a two-part baking utensil having a channel forming surface on one part. The bun is baked with the channel forming surface on the bottom and with more heat being applied to the channel forming surface than is applied to the other parts of the bun. Ribs may be simultaneously baked into the channel to prevent outflow of the liquid as the food is consumed.

6 Claims, 4 Drawing Figures

INVENTOR.
GEORGE L. SELLECK
BY Robert C. Heslin,
atty.

INVENTOR.
GEORGE L. SELLECK
BY Robert E. Heslin,
Atty.

NON-SATURABLE BUN

BACKGROUND OF THE INVENTION

This invention pertains to the art of baking buns and in particular relates to buns which are intended to be filled with liquified foods and sauces and held in the hand for eating.

Hotdogs, hamburgers, and other hand-held foods are familiar items. Lately, extension and further development in the art of preparing such foods has been taking place. For example, one now sees barbecued beef sandwiches which resemble hamburgers and chili dogs which resemble hot dogs. Items such as these incorporate a certain amount of solid food with a sauce. Anyone who has eaten them may well recall that the sauce causes certain problems. For one thing it tends to flow out of the sandwich and on to the person's hand as he is eating. Also, the sauce tends to saturate the roll and make it rather soggy before the article can be completely consumed. Thus, it would be highly desirable if a bun could be baked so that it would hold sauces and other like liquids without permitting them to easily flow out of the bun and onto the person's hand and if the bun itself would not saturate for a relatively longer period of time than is now the case.

Some prior schemes and devices seem to have been made with a view toward accommodating the insertion of foods. For example, U.S. Pat. No. 2,330,410, to R. E. Cyr shows an apparatus for making hot dog rolls having a channel to accommodate the hot dog. Similarly, U.S. Pat. No. 3,385,205 to C. V. McCloud concerns itself with the shape of a bun being baked for reception of meat such as wieners and other foods and fillers. But to the best of my knowledge, neither these patents nor any other prior art article, apparatus, or method concern themselves with the problems of saturation and food outflow discussed above.

It is, therefore, an object of this invention to provide a bun having a sufficiently thick and hard crusted interior channel to prevent the bun's being saturated when filled with partially creamed foods or foods suspended in sauce.

It is a further object of this invention to provide a bun having a channel therein with transverse ribs so as to help retain such types of food therein as the bun is consumed.

It is a further object of this invention to provide an apparatus for baking the bun having the above features Finally, it is an object of this invention to provide a method for baking buns having the above features.

The objects of this invention are accomplished through the use of a baking utensil having a channel-forming surface therein and by applying relatively more heat to the channel-forming surface than is applied to the other parts of the utensil. Also, means are provided for insuring that the dough being baked is held in close contact with the channel forming surface.

BRIEF DESCRIPTION OF DRAWINGS

Referring now to FIG. 1, there is shown a bun of the type desired, generally designated by the figure 10. The exterior wall 11 and the upper surface 12 of the bun have a baked finish much like that normally found on a dinner roll. There is an interior channel 13 having walls 14. The texture of the walls 14 is hard crusted in nature and may be compared generally with the crust formed on the so-called hard roll or the crust of a loaf of Vienna bread.

Within the channel 13 there are a number of transverse ribs 15. These are also constructed of bread formed in the fashion of a rib during the baking process.

In actual use the bun 10 serves a dual function. In the first place, the bun itself is, of course, to be eaten as a suitable food to accompany whatever it is filled with. Secondly, the bun serves as a vessel for holding foods prepared in sauces or liquified food preparations. This function is possible as a result of the hard crusted texture of the wall 14. This texture does not saturate easily and the bun can be held for longer than the normal eating time without it becoming saturated. Examples of the kinds of preparations that can be used with this bun are creamed turkey, chopped hot meatballs with sauce, chipped beef in cream, veal and peppers in their usual sauce, and other types of hot fillings. As the bun and filling are consumed, the ribs 15 tend to hold the remaining filling in place, thereby preventing it from running out.

Figure 2:
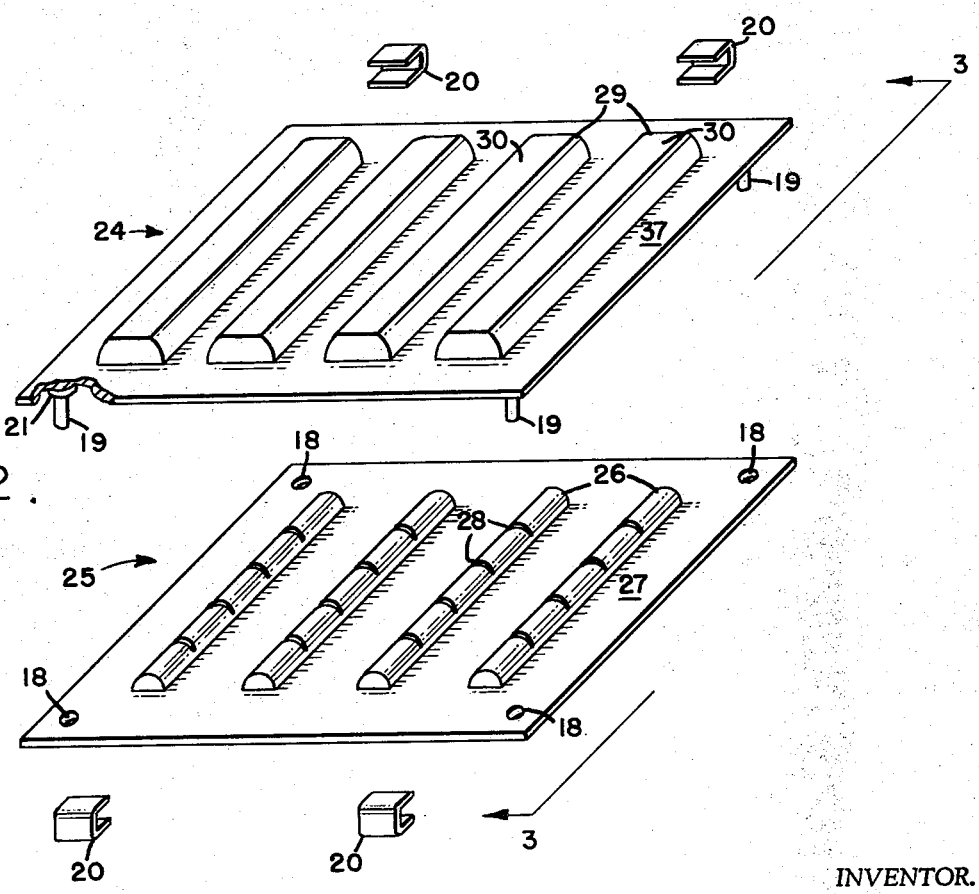
FIG. 2 is an exploded perspective view of the baking utensil embodying the invention.

Referring now to FIG. 2, there is shown an exploded view of one embodiment of a baking utensil which has been found suitable in practicing this invention. This baking utensil is comprised mainly of two parts, an upper member 24 and a lower member 25. The lower member has one or more channel-forming surfaces generally designated by the number 26. These surfaces protrude from a flat portion 27. Upper member 24 and lower member 25 can be made from a suitable sheet metal material.

For reasons that will appear later, it is desirable that the underside of the channel-forming surfaces be hollow. In other words, if one were to turn over lower member 25 of FIG. 2 and look on its underside, one would see elongated cavities therein, formed generally by the backs of channel-forming surfaces 26.

Figure 3:
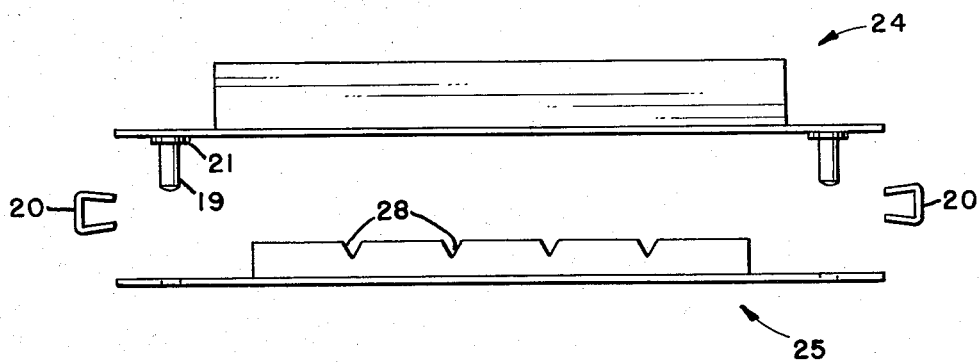
FIG. 3 is an end view of a portion of FIG. 2 looking in the direction of the arrows along line 3—3.

One or more rib-forming structures 28 may be formed upon the channel forming surface 26. FIG. 3 shows these as grooves when the lower member is viewed from the direction of the arrows on line 3—3 of FIG. 2. Of course, rib-forming structures 28 will protrude into the previously mentioned cavities which are formed by the back sides of the channel-forming surfaces 26.

Referring again to FIG. 2, one sees that at each of the four corners of lower member 25 a hole 18 is drilled for engagement with studs 19 which are mounted on upper member 24.

Upper member 24 has a number of dome-shaped members 29 equal to the number of channel forming surfaces in lower member 25. Each of these dome-shaped structures is hollow and is shaped so as to generally surround its corresponding channel-froming surface 26.

Figure 4:
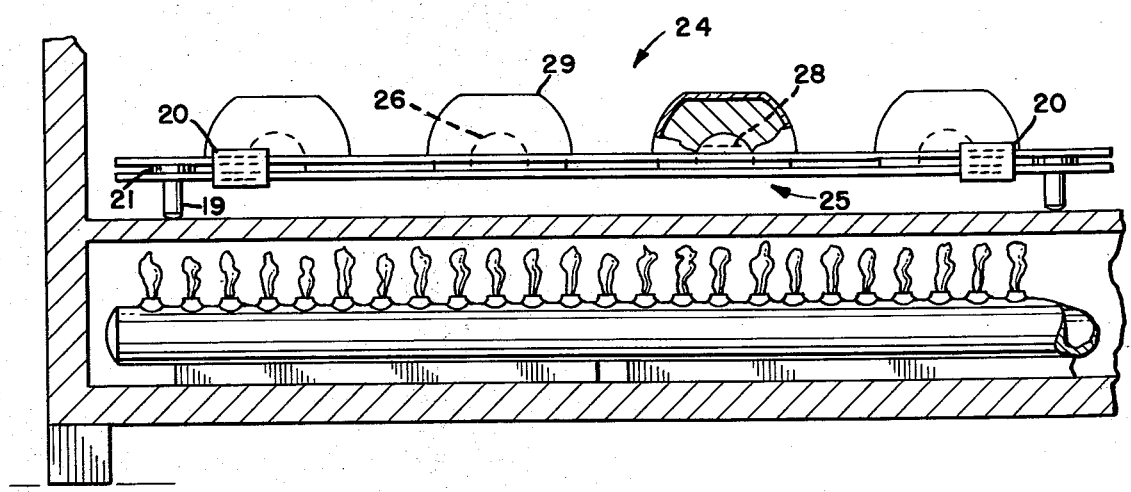
FIG. 4 shows the apparatus of FIG. 2 assembled and in place during baking.

The studs 19, previously mentioned, are each mounted with an associated spacer 21, as can be seen from the portion of upper member 24 which is broken away. It will appreciated that when upper member 24 is assembled with lower member 25, the spacers 21 will tend to hold the said members a fixed distance apart from one another. Thus, there will be an open space between flat surface 27 of lower member 25 and corresponding flat surface 37 of upper member 24. Also, the dimensions of channel-forming surface 26 are relatively smaller with relation to the interior dimensions of the dome-shaped structure 29 so that there will be a fixed amount of open space between channel-forming surfaces 26 and the interior of the dome-shaped structure 29 when the utensil is assembled. This spaced relation between upper member 24 and lower member 25 is maintained by the use of clips 20. These clips are fastened around upper member 24 and lower member 25 after assembly, as shown in FIG. 4 and prevent said members from moving apart as the pressure of the baking bread develops.

In practice, one utilizing the invention would prepare the baking dough and permit it to raise partially before placing in the baking utensil of FIG. 2. Experience has indicated that when using ordinary bread baking dough, a suitable waiting period for this purpose is 45 minutes. at ordinary room temperatures. This may be called the "first raise" and generally results in a doubling of size of the dough. The "second raise" is carried out in upper member 24. This member would be placed on a table with the studs facing up and a suitable amount of partially raised dough would be laid in the dome-shaped structures 29. Upper member 24 would then be placed on a warm surface for additional raising. It has been found desirable to obtain the desired amount of raising using ordinary bread dough by maintaining the warmed surface at approximately 125°F and leaving upper member thereon for approximately 10 to 12 minutes. The reason for conducting this second raise is that it renders the dough more manageable in the utensil. When the dough is first placed in upper member 24 after the first raise, it is somewhat springy and when stretched to the corners of the dome-shaped structure 29, it will creep back, leaving open spaces at the end thereof. Once the second raise has taken place, the dough may again be stretched to the extremities of the dome-shaped structure 29 and it will remain there.

It may be mentioned in connection with the second raising that dome-shaped structure 29 may be formed with a flat surface 30 therein which will rest on and be in contact with the warmed surface, thereby to promote the conduction of heat to the raising dough.

Following the second raising, lower member 25 is placed with its protruding channel-forming surfaces 26 down, on top of upper member 24 and pressed against the partially raised dough until contact is made with spacers 21. Then clips 20 are slipped over the edges of upper member 24 and lower member 25 so as to hold them in that relation against the pressure of the dough.

Now, the "third raising" will be conducted. For this purpose the entire assembled utensil is inverted and placed on the same warmed surface where the second raising occurred. One will appreciate that the utensil will be standing on the studs 19 and thus be maintained a short distance above the surface. Also, the previously mentioned cavities on the back side of channel forming surfaces 26 are in an advantageous position to capture the rising heat and promote raising. This final raising process occurs in approximately 15 to 20 minutes if the warmed surface is maintained at a temperature of approximately 125°F.

Once the dough is finally raised as previously described, the final baking process takes place. This is accomplished by the application of ordinary baking temperatures (350°–450°F) on the outside of the channel-forming surface 26. In the preferred method of using this apparatus, it is again permitted to stand on the studs 19 with the cavities on the outside of the channel-forming surfaces downward toward a source of heat. In this way, the rising heat is captured in the cavities, thereby promoting baking. Also, this method seems to have the advantage of employing gravity to keep the dough in close contact with the channel-forming surface. After a suitable baking period, say 10 to 14 minutes, the utensil may be removed from the oven and disassembled by removing clips and allowing the lower member to disengage. The completed roll may then be removed.

Figure 1:
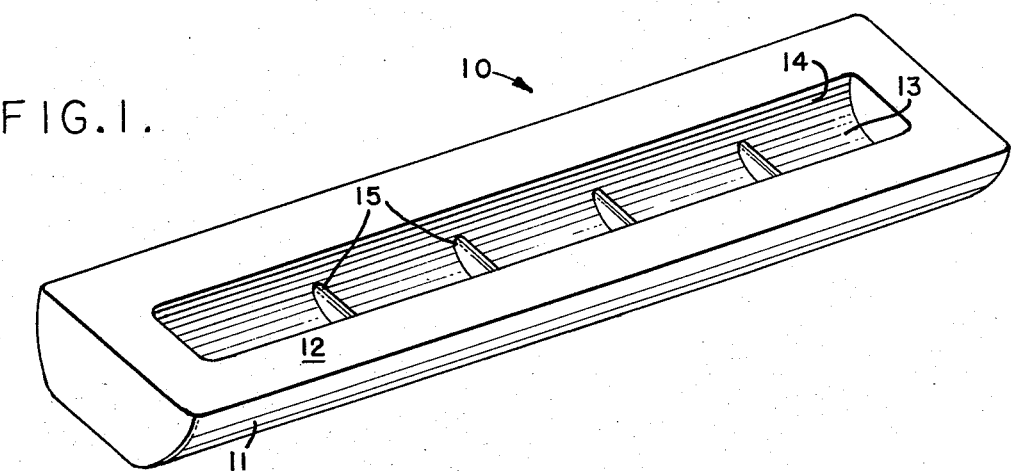
FIG. 1 is a perspective view of the bun which it is intended to produce by means of this invention.

The dimensions used in one apparatus which proved satisfactory in following the procedures described above may be illustrated by considering the dimensions of the roll produced thereby. The roll shown in FIG. 1 has an overall length of 7⅝ inches. Its overall width is 1¾ inches and the width of the channel 13 is ¾ inch. The length of the channel is 6⅝ inches. The dimensions of the baking utensil in FIG. 2 including the relative depth of the channel-forming surfaces 26 and the dome-shaped structure 29 are such as to result in a nominal thickness of one half inch in the walls and bottom of the roll. Finally, the rib-froming structures 28 may be of a size suitable to a rib having a height of approximately one fourth inch at its highest point above the bottom of the channel.

Thus is formed a roll with the desired hard-crusted and relatively saturation-proof interior having a fine, soft-baked, dinner roll finish on its exterior. The ribs, besides tending to make the roll more useful, have the additional advantage that they tend to prevent breakage during subsequent handling and packaging of the roll.

One can appreciate that the reason why the desired hard-crusted channel is formed is that more heat is applied to the baking channel than is applied elsewhere on the baking utensil. Also, care is taken to insure that the dough remains in tight contact with the channel-forming surface. In the preferred embodiment, just explained, these things are accomplished by inverting the entire utensil and allowing it to stand on the studs over a source of heat. It should not be inferred, however, that the process could not be equally successful by using some equivalent technique. Thus what has been explained is merely the preferred embodiment of the invention in question. It is intended by the appended claims to encompass within their coverage all modifications and variations which properly come within the spirit of this invention.

What is claimed is:

1. A method of making an edible bun having a channel formed in a top surface thereof which channel is particularly adapted for holding solid food and/or a liquid food substance, comprising the steps of:

placing a predetermined quantity of dough between the two mating parts of a two-part baking utensil one of which parts defines a recess to form the lower exterior bun portion and the other of which defines a thin-walled protuberance extending at least partly within the recess to form the bun channel, baking the dough by applying more heat to the side of the assembled utensil which comprises said other part than to the side which comprises said one part while concurrently maintaining the dough in close contact with said other part, and discontinuing the baking when the surface of the bun channel which is heated through said thin-walled protuberance has a hard surface crust which is substantially impermeable to liquids while the bottom bun surface has only a relatively thinner crust to provide a soft dinner-roll finish and the bun interior is of a soft, smooth bread texture.

2. The method of claim 1 wherein the channel is formed with at least one transverse rib by means of a corresponding transverse slit formed in said thin-walled protuberance of said other utensil part, said transverse rib aiding in the application of more heat to said bun channel and also preventing the overflow of liquid food substance from said channel as the bun is eaten.

3. The method of claim 1 wherein during said baking step said two-part utensil is placed in an oven with said other side facing downwardly.

4. The method of claim 1 wherein said dough is yeast-leavened and said baking step comprises the application of heat at a temperature of between 350° to 400° F. for 10 to 14 minutes.

5. The method of claim 1 wherein said dough is yeast-leavened and is partially raised before being placed in said one part of said utensil, said method further comprising the steps of applying a low temperature heat to said one utensil part after the dough is placed therein to further raise the dough, assembling said two utensil parts, and applying low temperature heat to said utensil to further raise the dough prior to said baking step.

6. An edible bun made in accordance with the method of claim 1.

* * * * *